United States Patent
Min et al.

(10) Patent No.: US 9,722,444 B2
(45) Date of Patent: Aug. 1, 2017

(54) ELECTRONIC DEVICE AND CHARGING INTERFACE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jie Min, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 210 days.

(21) Appl. No.: 14/683,911

(22) Filed: Apr. 10, 2015

(65) Prior Publication Data

US 2016/0233624 A1 Aug. 11, 2016

(30) Foreign Application Priority Data

Feb. 9, 2015 (CN) .......................... 2015 1 0065912

(51) Int. Cl.
*G06F 1/26* (2006.01)
*G06F 1/32* (2006.01)
*G06F 1/00* (2006.01)
*H02J 7/00* (2006.01)

(52) U.S. Cl.
CPC .......... *H02J 7/0068* (2013.01); *H02J 7/0036* (2013.01); *G06F 1/26* (2013.01); *G06F 1/32* (2013.01)

(58) Field of Classification Search
CPC ...................................... G06F 1/26; G06F 1/32
See application file for complete search history.

(56) References Cited

U.S. PATENT DOCUMENTS

| | | | | |
|---|---|---|---|---|
| 8,156,361 B2* | 4/2012 | Chin | ........................ | G06F 1/32 713/300 |
| 2002/0138776 A1* | 9/2002 | Cohen | ................. | G06F 13/4081 713/320 |
| 2004/0003307 A1* | 1/2004 | Tsuji | ..................... | G06F 1/3209 713/310 |
| 2006/0181241 A1* | 8/2006 | Veselic | ................... | G06F 1/266 320/107 |
| 2007/0023499 A1* | 2/2007 | Wurzburg | ............... | G06F 1/266 235/376 |
| 2008/0150512 A1* | 6/2008 | Kawano | .................. | G06F 1/266 323/351 |
| 2008/0201583 A1* | 8/2008 | Fujiwara | ................. | G06F 1/266 713/300 |

(Continued)

*Primary Examiner* — Phil Nguyen
(74) *Attorney, Agent, or Firm* — Steven Reiss

(57) ABSTRACT

An electronic device includes a platform controller hub and a charging interface. The charging interface includes a connector for coupling to a peripheral device, and a charging integrated circuit coupled to the connector. The connector includes an insert detecting member for detecting if the peripheral device is inserted. The charging integrated circuit can provide power to the connector. The platform controller hub can exchange data through the connector through the charging integrated circuit. The charging integrated circuit can cut off the power to the connector when the insert detecting member detects that no peripheral device is inserted in the connector.

18 Claims, 2 Drawing Sheets

(56) References Cited

U.S. PATENT DOCUMENTS

| | | | |
|---|---|---|---|
| 2010/0306565 A1* | 12/2010 | Umedu | G06F 1/266 713/324 |
| 2011/0016334 A1* | 1/2011 | Tom | G06F 1/266 713/300 |
| 2012/0139474 A1* | 6/2012 | Cho | G09G 3/2092 320/106 |
| 2012/0151231 A1* | 6/2012 | Hatta | G06F 1/266 713/320 |
| 2014/0302708 A1* | 10/2014 | MacDougall | H01R 13/641 439/488 |

* cited by examiner

ELECTRONIC DEVICE AND CHARGING INTERFACE

CROSS-REFERENCE TO RELATED APPLICATIONS

This application claims priority to Chinese Patent Application No. 201510065912.1 filed on Feb. 9, 2015, the contents of which are incorporated by reference herein.

FIELD

The subject matter herein generally relates to an electronic device and a charging interface for a peripheral device.

BACKGROUND

An electronic device, such as a computer, smart phone, or a consumer device, includes an input and output interface for data exchange with a peripheral device. The electronic device can also charge the peripheral device through the input and output interface.

BRIEF DESCRIPTION OF THE DRAWINGS

Implementations of the present technology will now be described, by way of example only, with reference to the attached figures.

DETAILED DESCRIPTION

Figure 1:
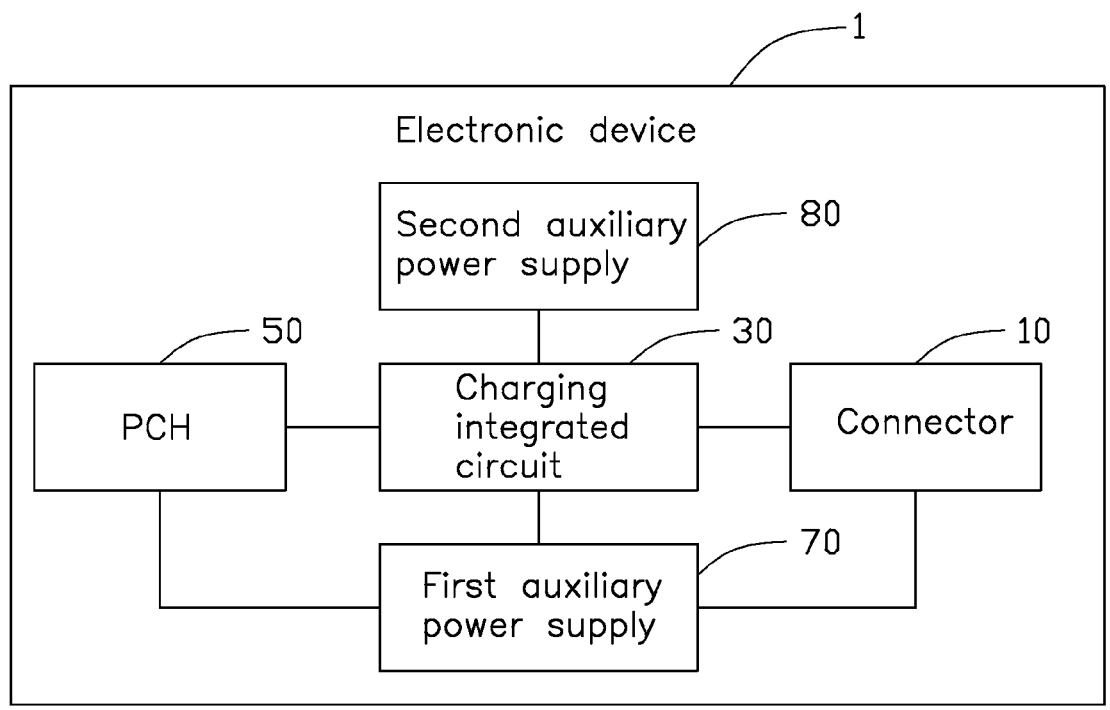
FIG. 1 is a diagrammatic view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a diagrammatic view of an electronic device in one embodiment. The electronic device 1 can be a server, a laptop computer, a desktop computer, a tablet computer, an all-in-one computer, a smart TV, or a set-box-top. The electronic device 1 includes a platform controller hub (PCH) 50 and a charging interface. The charging interface includes a charging integrated circuit (IC) 30 and a connector 10. The charging interface can be a USB interface. The PCH 50, the IC 30, and the connector 10 are coupled to a first auxiliary power supply 70. The IC 30 is coupled to a second auxiliary power supply 80.

The connector 10 is coupled to the charging IC 30. The charging IC 30 is coupled to the PCH 50. The connector 10 can receive a peripheral device and charge the peripheral device. The PCH 50 can exchange data with peripheral device through the connector 10.

Figure 2:
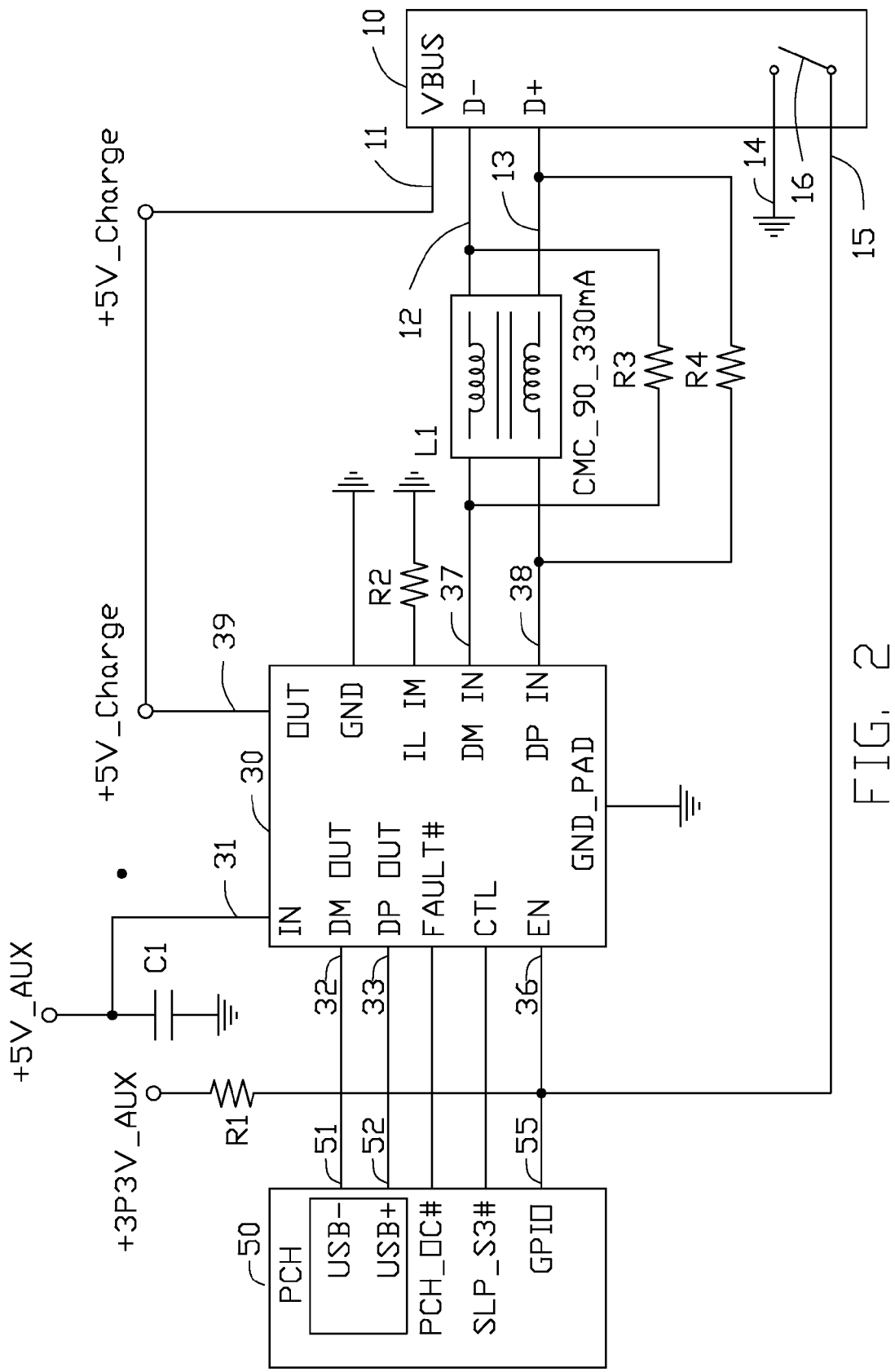
FIG. 2 is a circuit view of the electronic device of FIG. 1.

FIG. 2 illustrates a circuit view of the electronic device in one embodiment. The connector 10 includes a power pin 11, a first data pin 12, a second data pin 13, and an insert detecting member. The insert detecting member can include a first insert pin 14, a second insert pin 15, and a tab 16. The first insert pin 14 is grounded. The second insert pin 15 can receive a 3.3V direct current voltage through a resistor R1. The 3.3V direct current voltage can be provided by the first auxiliary power supply 70. A resistance of the resistor R1 can be 10000 ohm. The tab 16 is can be coupled with the first insert pin 14 and the second insert pin 15. When no peripheral device is inserted in the connector 10, the tab 16 couples the first insert pin 14 to the second insert pin 15. When the peripheral device is inserted in the connector 10, the tab 16 can be pressed by the peripheral device to resiliently deform to disconnect the first insert pin 14 and the second insert pin 15.

The charging integrated circuit (IC) 30 includes a power supply pin 31, a first data input pin 32, a second data input pin 33, a detecting pin 36, a first data output pin 37, a second data output pin 38, and a power output pin 39. The power supply pin 31 can receive a 5V direct current voltage. The 5V direct current voltage can be provided by the second auxiliary power supply 80. The first data input pin 32 and the second data input pin 33 are coupled to the PCH 50 for data exchange. The detecting pin 36 is coupled to the second insert pin 15 of the connector 10. The first data output pin 37 and the second data output pin 38 are coupled to the connector 10 for data exchange. The power output pin 39 can be coupled to the power pin 11 of the connector 10. When the detecting pin 36 receives a low level signal, the power output pin 39 cuts off power to the connector 10. When the detecting pin 36 receives a high level signal, the power output pin 39 supplies power to the connector 10.

The PCH 50 includes a first peripheral pin 51, a second peripheral pin 52, and a general purpose input and output (GPIO) pin 55. The first peripheral pin 51 and the second peripheral pin 52 are coupled to the first data input pin 32 and the second data input pin 33 of the charging IC 30. The PCH 50 can exchange data with the coupled peripheral device through the charging IC 30. The GPIO pin 55 is coupled to the second insert pin 15 of the connector 10. The power output pin 39 can cut off power to the connector 10 when the GPIO pin 55 is grounded.

In use, when no peripheral device is plugged into the connector 10, the first insert pin 14 and the second insert pin 15 are coupled by the tab 16. The detecting pin 36 is grounded and receives a low level signal. The power output pin 39 cuts off power to the connector 10. When the peripheral device is plugged into the connector 10, the tab 16 is pressed by the peripheral device to resiliently deform. The first insert pin 14 and the second insert pin 15 are disconnected. The detecting pin 36 receives a high level signal, the power output pin 39 supplies power to the connector 10.

When the GPIO pin 55 of PCH 50 is grounded, the detecting pin 36 receives the high level signal, and the charging IC 30 cuts off power to the connector 10.

The embodiments shown and described above are only examples. Many details are often found in the art such as the other features of an electronic device and charging interface. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An electronic device comprising:
    a platform controller hub; and
    a charging interface comprising:
        a connector for coupling to a peripheral device, comprising an insert detecting member for detecting if the peripheral device is inserted; and
        a charging integrated circuit coupled to the connector;
    wherein the charging integrated circuit is configured to transfer power to the connector; the platform controller hub is configured to exchange data through the connector through the charging integrated circuit; the charging integrated circuit is configured to cut off the power to the connector when the insert detecting member detects that no peripheral device is inserted in the connector; and the platform controller hub is further configured to control the charging integrated circuit to cut off the power to the connector; wherein the insert detecting member comprises a first insert pin, a second insert pin, and a tab, the tab is configured to couple the first insert pin to the second insert pin when no peripheral device is inserted in the connector.

2. The electronic device of claim 1, wherein the tab is configured to be pressed by the peripheral device to resiliently deform to disconnect the first insert pin and the second insert pin.

3. The electronic device of claim 1, wherein the charging integrated circuit comprises a power output pin, and the power output pin is coupled to the connector.

4. The electronic device of claim 3, wherein the charging integrated circuit further comprises a detecting pin; the first insert pin is grounded, the second insert pin is coupled to the detecting pin and is configured to receive a first direct current voltage, when the detecting pin receives a low level signal, the power output pin cuts off power to the connector.

5. The electronic device of claim 4, wherein the first direct current voltage is about 3.3V.

6. The electronic device of claim 4, wherein the platform controller hub comprises a general purpose input and output (GPIO) pin, the GPIO pin is coupled to the second insert pin, and the power output pin is configured to cut off power to the connector when the GPIO pin is grounded.

7. The electronic device of claim 1, wherein the charging interface is a USB interface.

8. The electronic device of claim 1, wherein the charging integrated circuit comprises a power supply pin, and the power supply pin receives a second direct current voltage.

9. The electronic device of claim 8, wherein the second direct current voltage is about 5V.

10. A charging interface comprising:
    a connector for coupling a peripheral device, comprising an insert detecting member for detecting if the peripheral device is inserted;
    a charging integrated circuit coupled to the connector;
    an auxiliary power supply connected to the charging integrated circuit; and
    a platform control hub connected to the charging integrated circuit;
    wherein the charging integrated circuit is configured to supply power to the connector; the charging integrated circuit is configured to cut off the power to the connector when the insert detecting member detects that no peripheral device is inserted in the connector; and the platform controller hub is further configured to control the charging integrated circuit to cut off the power to the connector; wherein the insert detecting member comprises a first insert pin, a second insert pin, and a tab, the tab is configured to couple the first insert pin to the second insert pin when no peripheral device is inserted in the connector.

11. The charging interface of claim 10, wherein the tab is configured to be pressed by the peripheral device to resiliently deform to disconnect the first insert pin and the second insert pin.

12. The charging interface of claim 10, wherein the charging integrated circuit comprises a power output pin, and the power output pin is coupled to the connector.

13. The charging interface of claim 12, wherein the charging integrated circuit further comprises a detecting pin; the first insert pin is grounded, the second insert pin is coupled to the detecting pin and is configured to receive a first direct current voltage, when the detecting pin receives a low level signal, the power output pin cuts off power to the connector.

14. The charging interface of claim 13, wherein the first direct current voltage is about 3.3V.

15. The charging interface of claim 12, wherein the power output pin is configured to output 5 V direct current to the connector.

16. The charging interface of claim 10, wherein the charging interface is a USB interface.

17. The charging interface of claim 10, wherein the charging integrated circuit comprises a power supply pin, and the power supply pin is configured to receive a second direct current voltage.

18. The electronic device of claim 13, wherein the platform controller hub comprises a general purpose input and output (GPIO) pin, the GPIO pin is coupled to the second insert pin, and the power output pin is configured to cut off the power to the connector when the GPIO pin is grounded.

* * * * *